(12) United States Patent
Okada et al.

(10) Patent No.: US 11,009,353 B2
(45) Date of Patent: May 18, 2021

(54) NON-TRANSITORY COMPUTER-READABLE STORAGE MEDIUM STORING NONLINEAR OPTIMIZATION PROGRAM OF CONTINUOUS VALUE OPTIMIZATION PROBLEM, NON-TRANSITORY COMPUTER-READABLE STORAGE MEDIUM STORING ROUTE SEARCH PROGRAM, AND ROUTE SEARCH APPARATUS

(71) Applicants: DENSO CORPORATION, Kariya (JP); Kyoto University, Kyoto (JP)

(72) Inventors: Shuntaro Okada, Kariya (JP); Masayoshi Terabe, Kariya (JP); Masayuki Ohzeki, Kariya (JP)

(73) Assignees: DENSO CORPORATION, Kariya (JP); Kyoto University, Kyoto (JP)

( * ) Notice: Subject to any disclaimer, the term of this patent is extended or adjusted under 35 U.S.C. 154(b) by 226 days.

(21) Appl. No.: 16/391,467

(22) Filed: Apr. 23, 2019

(65) Prior Publication Data
US 2019/0249990 A1 Aug. 15, 2019

Related U.S. Application Data

(63) Continuation-in-part of application No. PCT/JP2017/032850, filed on Sep. 12, 2017.

(30) Foreign Application Priority Data
Nov. 29, 2016 (JP) .............................. JP2016-231278

(51) Int. Cl.
*G01C 21/20* (2006.01)
*G08G 1/16* (2006.01)
(Continued)

(52) U.S. Cl.
CPC ............. *G01C 21/20* (2013.01); *B60W 30/09* (2013.01); *G01C 21/34* (2013.01);
(Continued)

(58) Field of Classification Search
CPC .... G01C 21/20; G01C 21/34; G01C 21/3461; B60W 30/09; G05B 13/02; G06N 99/00; G08G 1/16
(Continued)

(56) References Cited

U.S. PATENT DOCUMENTS 6,031,984 A * 2/2000 Walser ................... G06Q 10/06
703/2
2012/0232741 A1* 9/2012 Sekiyama ............ G09B 19/167
701/29.1

FOREIGN PATENT DOCUMENTS

JP H11-066039 A 3/1999

\* cited by examiner

*Primary Examiner* — Gertrude Arthur Jeanglaude
(74) *Attorney, Agent, or Firm* — Posz Law Group, PLC (57) ABSTRACT

A non-transitory computer-readable storage medium storing a nonlinear optimization program of a continuous value optimization problem, the program relating to an optimization problem, is provided. The program causes an optimization apparatus to execute repeatedly and alternately procedure comprising: updating a variable of an evaluation function, causing an equality constraint to be gradually approached while searching for a condition at which the evaluation function approaches an extreme value; and updating the variable of the equality constraint, causing a condition at which the evaluation function to become close to the extreme value while keeping the equality constraint satisfied is gradually approached.

9 Claims, 5 Drawing Sheets

(51) Int. Cl.
  *G01C 21/34* (2006.01)
  *G05B 13/02* (2006.01)
  *G06N 99/00* (2019.01)
  *B60W 30/09* (2012.01)
(52) U.S. Cl.
  CPC ......... *G01C 21/3461* (2013.01); *G05B 13/02* (2013.01); *G06N 99/00* (2013.01); *G08G 1/16* (2013.01)
(58) Field of Classification Search
  USPC ....................................................... 701/411
  See application file for complete search history.

NON-TRANSITORY COMPUTER-READABLE STORAGE MEDIUM STORING NONLINEAR OPTIMIZATION PROGRAM OF CONTINUOUS VALUE OPTIMIZATION PROBLEM, NON-TRANSITORY COMPUTER-READABLE STORAGE MEDIUM STORING ROUTE SEARCH PROGRAM, AND ROUTE SEARCH APPARATUS

CROSS REFERENCE TO RELATED APPLICATIONS

The present application is a continuation-in-part of International Patent Application No. PCT/JP2017/032850 filed on Sep. 12, 2017, which designated the U.S. and claims the benefit of priority from Japanese Patent Application No. 2016-231278 filed on Nov. 29, 2016. The entire disclosures of all of the above applications are incorporated herein by reference.

TECHNICAL FIELD

The present disclosure relates to a nonlinear optimization program of a continuous value optimization problem, a route search program, and a route search apparatus.

BACKGROUND

For example, a driving support device has been developed as a measure to prevent accidents, and in particular, a driving support device has been developed to reduce the driver's burden for driving. It is confirmed by the inventors that when this type of driving support device searches for a route, the position and speed on a route are each defined as a function according to time, and an evaluation function based on the functions corresponding to the position and speed is introduced, so that an optimum route can be searched for by acquiring the position and speed that satisfy an extreme value (for example, a minimum value) of the evaluation function.

SUMMARY

The present disclosure provides a program of a continuous value optimization problem, the program relating to an optimization problem and deriving an optimum value, is provided. The program may cause an apparatus to execute repeatedly and alternately procedure comprising: updating a variable of an evaluation function, causing an equality constraint to be gradually approached while searching for a condition at which the evaluation function approaches an extreme value; and updating the variable of the equality constraint, causing a condition at which the evaluation function to become close to the extreme value while keeping the equality constraint satisfied is gradually approached.

BRIEF DESCRIPTION OF DRAWINGS

The abovementioned object, other objects, features and advantages of the present disclosure will become more apparent from the following detailed description with reference to the accompanying drawings. The drawings are as follows.

DETAILED DESCRIPTION

A related art discloses a technique minimizing the evaluation function with a constraint condition by dealing with the evaluation function and the constraint condition independently, and separating an updating process of variable for minimizing the evaluation function and an updating process of variable for satisfying the constraint condition, and then alternately executing these two updating processes.

The inventors have found the following. For example, the value of the evaluation function of the route of a movable body (referred to as the evaluation value) can be set according to the position and the speed (for example, the relative position with respect to another vehicle, and the difference between the current speed and the speed limit), and the evaluation function can be expressed by a function with the position $x(t)$ and the speed $v(t)$ as variables. Here, the position $x(t)$ and the speed $v(t)$ have a relation of equality constraint expressed by $x(t+1)=x(t)+v(t)\cdot\Delta t$. Routes that do not satisfy the equality constraint may be unrealistic as the route of the movable body, so that it may be necessary to always output a route that satisfies the equality constraint. However, the route search is a real-time process, and it may be assumed that a solution is output before obtainment of an extreme value is completed. For this reason, a method of creating the extreme value that always satisfies the equality constraint may be necessary even in the middle of creation of the extreme value. Although the related art describes a method for the case having equality constraint, the equality constraint may be not be always satisfied during the extreme value creating process.

It may be conceivable to regard the speed $v(t)$ as a function of the position $x(t)$ and to make the evaluation function have an extreme value as a function of the position $x(t)$, but when the evaluation function is expressed only as a function of the position $x(t)$, the optimization processing performed with respect to the absolute position $x(t)$ and the optimization processing performed with respect to the position difference $x(t+1)$ $x(t)$ having temporal change are executed at the same time so that it may be likely that the convergence to the extreme value of the evaluation function will take more time. This type of difficulty may not be limited to the route search processing and occurs in various kinds of difficulties.

The present disclosure provides a nonlinear optimization program of a continuous value optimization problem, a route search program, and a route search apparatus, which can perform high-speed processing while always keeping a given equality constraint satisfied.

According to one aspect of the present disclosure, a search program related to an optimization problem for deriving a variable satisfying a condition that an evaluation function provided with an equality constraint corresponding to the variable approaches an extreme value or an optimum value of an evaluation function is provided. The search program is a program that executes processing by preparing a variable of the evaluation function separated independently from a variable of the equality constraint, and using an additional equality constraint that makes the variable of the evaluation function and the variable of the equality constraint to agree with each other when applying a Lagrange multiplier method with equality constraint by using a Lagrange multiplier for an evaluation function.

According to the present disclosure, the optimization apparatus is made to execute alternately and repeatedly a procedure for updating a variable of the evaluation function so that the equality constraint is gradually approached while searching for a condition that makes the evaluation function close to an extreme value, and a procedure of updating a variable of the equality constraint so that a condition that makes the evaluation function close to the extreme value while keeping the equality constraint satisfied is gradually approached. In this manner, it may be possible to process the optimum control at high speed while the variable of the equality constraint always satisfies the equality constraint.

Figure 1A:
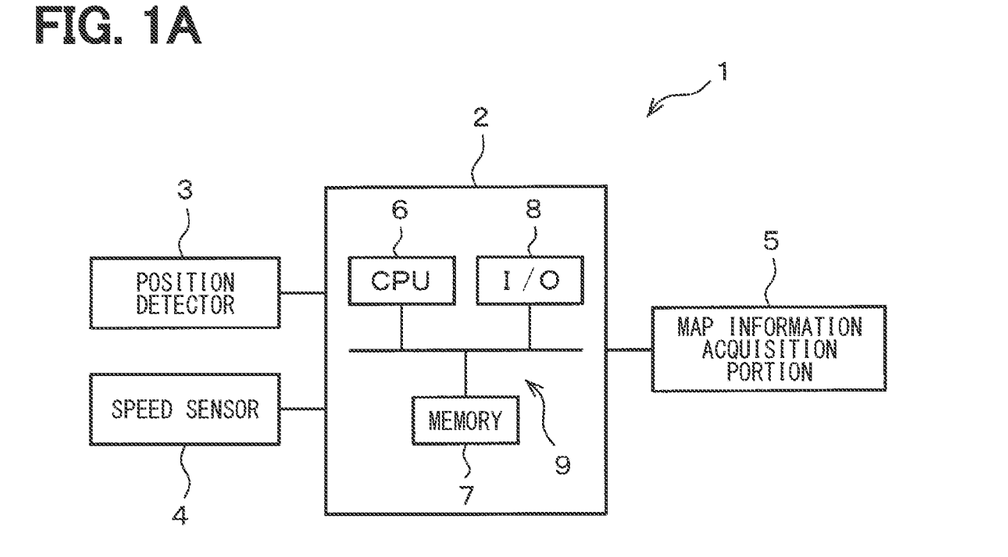
FIG. 1A is an electrical configuration diagram of a route search apparatus according to an embodiment.

Hereinafter, an embodiment of a nonlinear optimization program of a continuous value optimization problem, a route search program, and a route search apparatus of the present disclosure will be described with reference to the drawings. As shown in FIG. 1A, a route search apparatus 1 includes a controller 2 and is configured by connecting a position detector 3, a speed sensor 4, a map information acquisition portion 5, and the like.

The route search apparatus 1 is also configured as an optimization apparatus that optimizes a route through which a movable body passes an optimum position at a future time. The controller 2 is configured by using a microcomputer 9 in which a CPU 6, a memory 7 composed of a ROM, a RAM, a nonvolatile memory, etc., and an input/output interface (I/O) 8 are connected by a bus, and an optimization program related to the optimization problem is stored in the memory 7.

Figure 1B:
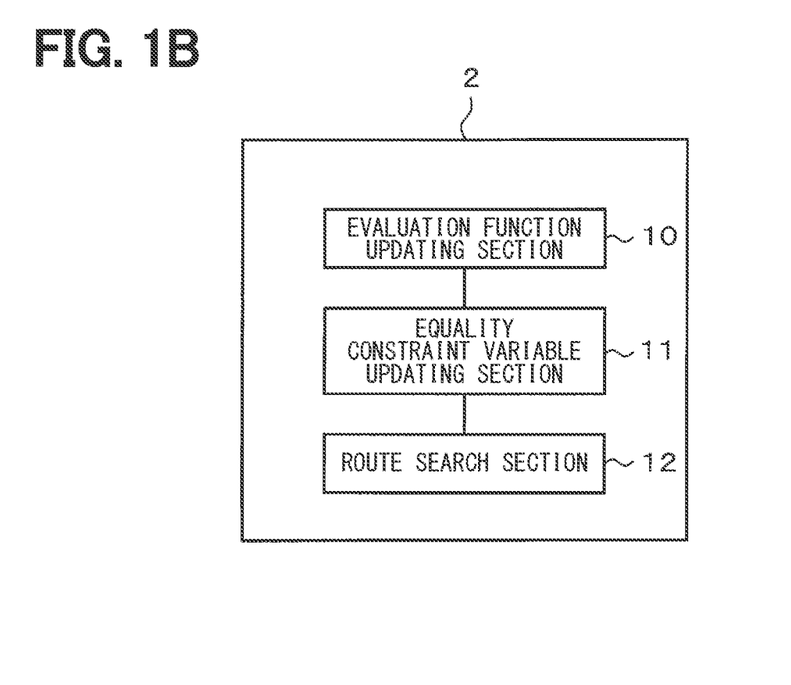
FIG. 1B is a functional configuration diagram of the route search apparatus.

As functions achieved by the controller 2 executing the optimization program, functions as an evaluation function updating section 10, an equality constraint variable updating section 11, and a route search section 12 can be mentioned, as shown in FIG. 1B. Although not shown, the controller 2 may be provided with functions as an augmented Lagrange multiplier updating section and an extreme value creating section.

The microcomputer 9 executes various processes by executing the optimization program stored in the memory 7 as a non-transitional substantive recording medium (also referred to as a computer-readable non-transitory storage medium), and derives and outputs a variable (position variable $x_{ia}$, and speed variable $v_{ia}$ to be described later) satisfying a condition that the evaluation function, that is, $H(\{x_{ia}, v_{ia}\})$ to be described later approaches the extreme value, or an optimum value of the evaluation function.

The position detector 3 detects information on the current position using, for example, a global positioning system (GPS) or the like and outputs the information to the controller 2. The speed sensor 4 detects the moving speed of a movable body (for example, a car) C and outputs the information to the controller 2. The map information acquisition portion 5 acquires map information stored in advance in a predetermined storage device (for example, HDD) or map information from an external map server (not shown). In other words, the map information acquisition portion 5 may read the map information stored in the storage device or the external map server and may output the read map information to the controller 2.

Figure 2:
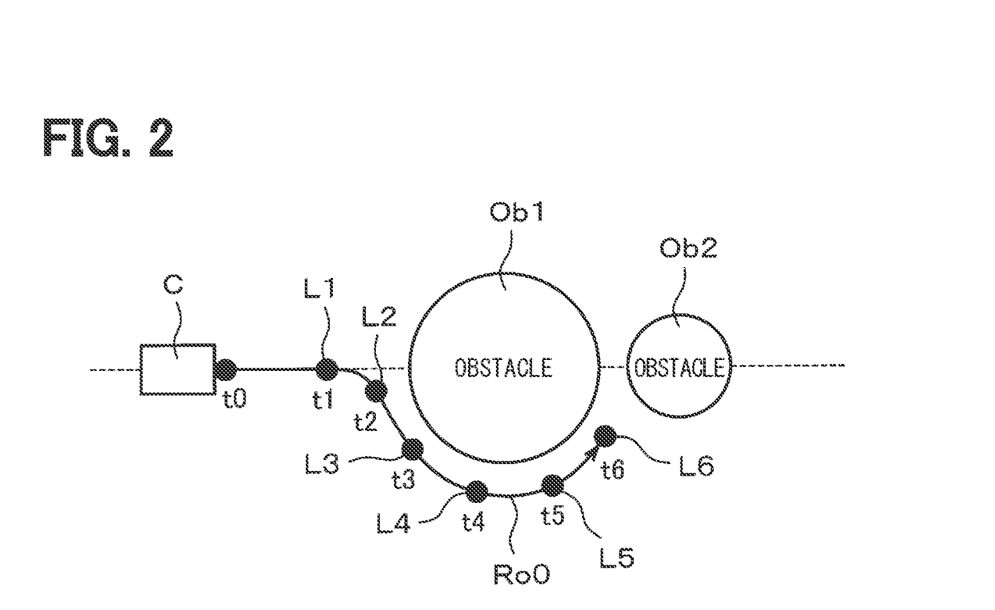
FIG. 2 is a part 1 of a bird's-eye view showing an optimum route of a movable body at a certain time.
Figure 3:
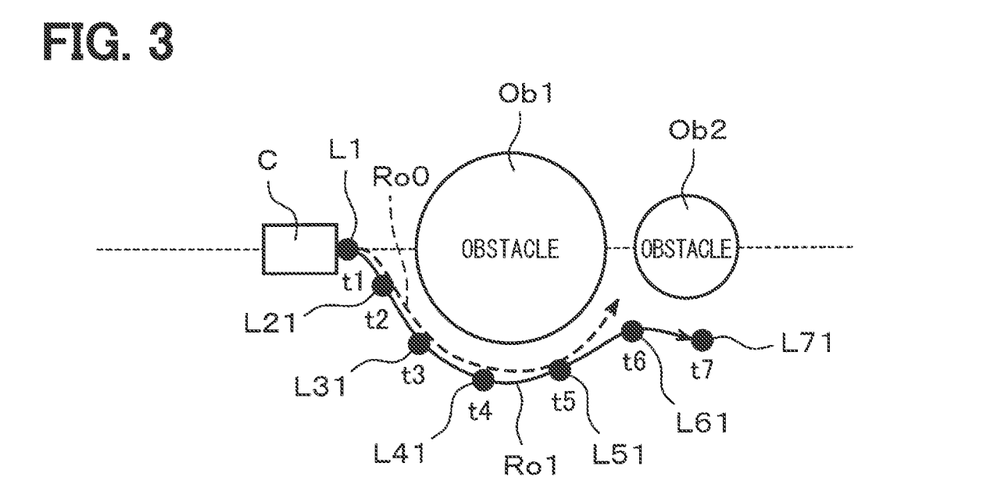
FIG. 3 is a part 2 of a bird's-eye view showing an optimum route of the movable body at a certain time.

FIGS. 2 and 3 show the bird's-eye views of the arrangement relationship between the movable body C and obstacles Ob1, and Ob2 at a certain continuous time. The microcomputer 9 of the controller 2 executes a route search program, for example, as an optimization program stored in the memory 7, so as to perform the model predictive control on the basis of the current position information acquired from the position detector 3, the moving speed information of the movable body C acquired from the speed sensor 4, and the map information acquired by the map information acquisition portion 5. A model predictive control may be performed by using various types of information obtained by other sensors such as a camera for detecting movable bodies in the vicinity of the vehicle (for example, a car, motorcycle, and person) or the obstacles Ob1 and Ob2, an ultrasonic sensor, and a distance measurement device for measuring the distance to a movable body around the vehicle and the obstacles Ob1 and Ob2, and the like.

This model predictive control is a technique for performing future prediction, and is a technique for performing optimum control over a certain period including the future, and updating these optimum controls at predetermined time intervals (for example, t=0 to T). The route search apparatus 1 derives an optimum traveling route of the movable body C in a certain period including the future by using the model predictive control technique and can support driving to guide the movable body to a predetermined space without colliding with the obstacle Ob1 or Ob2.

When performing route search processing while avoiding collision with the obstacle Ob1 or Ob2, the controller 2 determines the optimum movement position L1 at time t1 by deriving the optimum route Ro0 of the movable body C combining the positions L1, L2, L3, L4, L5, and L6 from the current time t0 to the future times t1 to t6 as shown in the bird's-eye view at time t0 in FIG. 2.

FIG. 3 shows a bird's-eye view at time t1 at which the next route search processing is performed. As shown in FIG. 3, the controller 2 newly derives the optimum route Ro1 combining the positions L1, L21, L31, L41, L51, L61, and L71 at the future times t2 to t7 after the current time t1 in addition to the position L1 at the current time t1. The optimum route Ro1 at time t1 is considered to be a locus close to the optimum route Ro0 at time t0. At this time, when the controller 2 executes the route search processing, it may be preferable to calculate the optimum route by providing an equality constraint like the following equation (1).

[Equation 1]

$$x(t+1) = x(t) + v(t) \cdot \Delta t \tag{1}$$

Here, x(t) represents the position of the movable body. The v(t) represents the speed of the movable body. This is an equality constraint derived considering the route along which the movable body can actually travel. If the solution output during the route search processing does not satisfy the equality constraint, a route which is physically impracticable is output. Therefore, it may be preferable to calculate the optimum route so as to satisfy the equality constraint of equation (1). Now, the evaluation function of the route search can be generally expressed as a function of the position variable x(t) and the speed variable v(t) as shown in the following equation (2).

[Equation 2]

$$\underset{\{x(t)\},\{v(t)\}}{\operatorname{argmin}} H(\{x(t)\}, \{v(t)\}) \quad (2)$$
$$t = 1 \sim T$$

The traveling route of its own movable body (hereinafter, referred to as subject car assuming that the movable body is a car) C1 shown in FIGS. 4 and 5 also depends on the travelling routes of other movable bodies (hereinafter referred to as different cars assuming that the movable bodies are cars) C2 and C3. Therefore, it may be preferable that the route search apparatus 1 searches for the optimum route of the subject car C1 and at the same time searches for the optimum routes of the different cars C2 and C3, and determines the moving route of the subject car C1 under that condition. For example, as shown in FIG. 4, route search processing is considered assuming that while traveling on a driving lane R1 of a road having two lanes R1 and R2 on each side, the subject car C1 safely overtakes the different car C2 traveling on the same driving lane R1.

Figure 4:
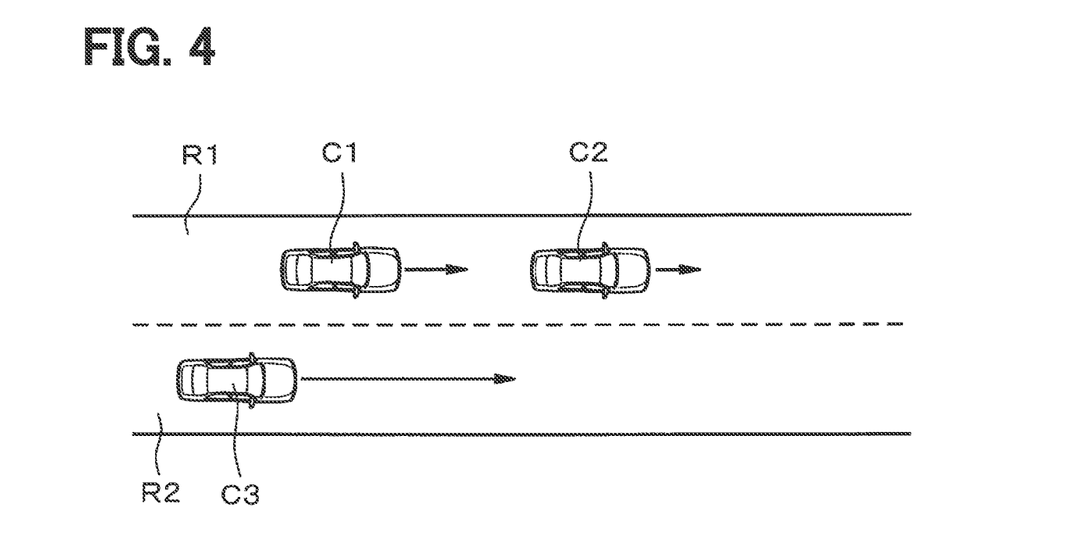
FIG. 4 is a part 1 of a bird's-eye view schematically showing the positional relationship of multiple movable bodies at the time of traveling.
Figure 5:
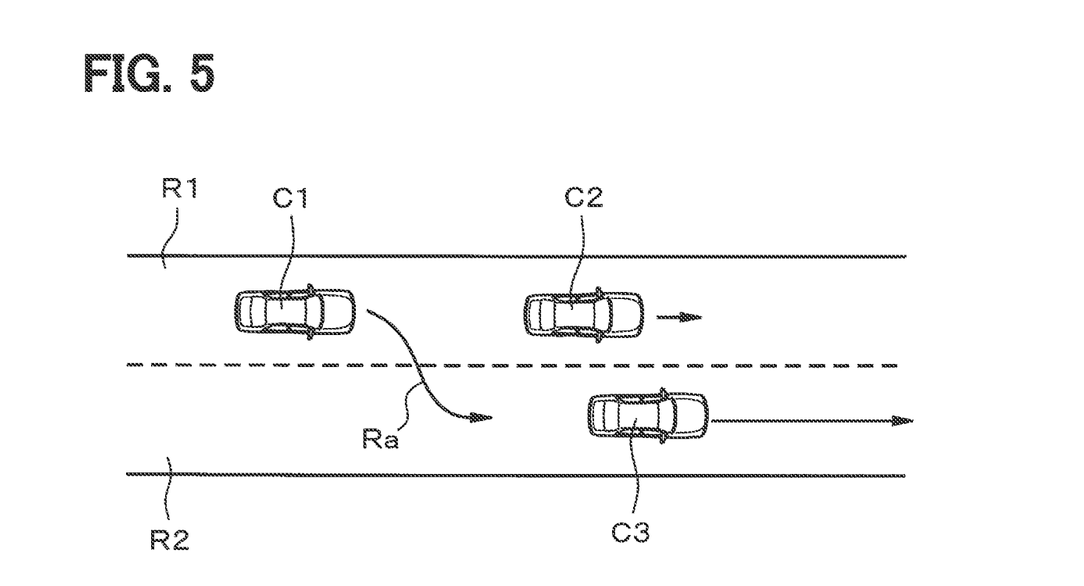
FIG. 5 is a part 2 of a bird's-eye view schematically showing the positional relationship of the multiple movable bodies at the time of traveling.

As shown in FIG. 4, it is assumed that the different car C2 traveling in the driving lane R1 travels in the driving lane R1 regardless of how the subject car C1 travels. When the different car C3 located behind the subject car C1 and traveling on the overtaking lane R2 is faster than the traveling speed of the subject car 1, it is assumed that the different car C3 overtakes the subject car C1 from behind.

At this time, if the subject car C1 changes the lane from the driving lane R1 to the overtaking lane R2, there is a possibility of collision. Therefore, it may be preferable for the controller 2 of the route search apparatus 1 mounted on the subject car C1 to predict the traveling route of the different car C3, and to search for the route Ra for the lane change from the driving lane R1 to the overtaking lane R2 as the optimum route after confirming the fast different car C3 has overtaken the subject car C1 as shown in FIG. 5. At this time, the controller 2 prepares a determinant as shown in the following equation (3), as the position variable x(t) and the speed variable v(t), which are optimization variables of the route search.

[Equation 3]

$$\begin{pmatrix} x_{11}(0) & x_{11}(1) & x_{11}(2) & \ldots & x_{11}(T) \\ x_{12}(0) & x_{12}(1) & x_{12}(2) & \ldots & x_{12}(T) \\ v_{11}(0) & v_{11}(1) & v_{11}(2) & \ldots & v_{11}(T) \\ v_{12}(0) & v_{12}(1) & v_{12}(2) & \ldots & v_{12}(T) \\ x_{21}(0) & x_{21}(1) & x_{21}(2) & \ldots & x_{21}(T) \\ x_{22}(0) & x_{22}(1) & x_{22}(2) & \ldots & x_{22}(T) \\ v_{21}(0) & v_{21}(1) & v_{21}(2) & \ldots & v_{21}(T) \\ v_{22}(0) & v_{22}(1) & v_{22}(2) & \ldots & v_{22}(T) \\ \vdots & \vdots & \vdots & \ldots & \vdots \\ x_{i1}(0) & x_{i1}(1) & x_{i1}(2) & \ldots & x_{i1}(T) \\ x_{i2}(0) & x_{i2}(1) & x_{i2}(2) & \ldots & x_{i2}(T) \\ v_{i1}(0) & v_{i1}(1) & v_{i1}(2) & \ldots & v_{i1}(T) \\ v_{i2}(0) & v_{i2}(1) & v_{i2}(2) & \ldots & v_{i2}(T) \\ \vdots & \vdots & \vdots & \ldots & \vdots \end{pmatrix} \quad (3)$$

Here, the first suffix such as "1", "2" . . . or "i" assigned to position variables $x_{11}$ and $x_{12}$, speed variables $v_{11}$ and $v_{12}$, etc. for example is an identification code for discriminating the subject car C1 from the different cars C2 and C3, and also identifying the different cars C2 and C3 located around the subject car C1 in particular. In this equation (3), this suffix "1" is used as the identification code corresponding to the subject car C1, and the suffixes "2" to "i" are the identification codes corresponding to the different cars C2 and C3.

The second suffix "1" or "2" assigned to the position variables $x_{11}$ and $x_{12}$, the speed variables $v_{11}$ and $v_{12}$, etc. indicates the axes of the dimension, and is an identification code indicating whether the axis is x coordinate or y coordinate for example. In the present embodiment, since it is assumed that route search processing is performed with a maximally two-dimensional bird's-eye view, "1" is taken as the x coordinate and "2" is taken as the y coordinate in this equation (3).

For simplicity of description, the processing is shown two-dimensionally, but may be considered in three or more dimensions. Also, in the position variables $x_{11}(0)$, $x_{11}(1)$ . . . $x_{11}(T)$ and the like, the numeral "0" in parentheses indicates a current time point, and the numerals "1, 2, . . . , T" represent the time points in the future relative to the current time point. That is, $x_{i\alpha}(t)$ represents the a-th position variable of the vehicle i at time t, and $v_{i\alpha}(t)$ represents the α-th speed variable of the vehicle i at time t.

An equation made by generalizing equation (2) indicating the evaluation function and equation (1) indicating the equality constraint, and applying the determinant (3) thereto can be shown as equation (4).

[Equation 4]

$$\underset{\{x_{i\alpha}\},\{v_{i\alpha}\}}{\operatorname{argmin}} H(\{x_{i\alpha}\}, \{v_{i\alpha}\}) \text{ s.t. } v_{i\alpha}^{(-)} = W x_{i\alpha} \quad (4)$$

Here, the coefficient matrix W can be expressed by equation (5-1), the position variable matrix $x_{i\alpha}$ can be expressed by equation (5-2), the speed variable matrix $v_{i\alpha}$, between the times 0 and T can be expressed by equation (5-3), and the speed variable matrix $v_{i\alpha}^{*}(-)$ between times 0 and T−1 is defined as in equation (5-4).

[Equation 5]

$$W = \begin{pmatrix} -1 & 1 & 0 & \ldots & 0 \\ 0 & -1 & 1 & \ldots & 0 \\ \vdots & \vdots & \vdots & \ddots & \vdots \\ 0 & 0 & 0 & \ldots & 1 \end{pmatrix} \quad (5\text{-}1)$$

$$x_{i\alpha} = \begin{pmatrix} x_{i\alpha}(0) \\ x_{i\alpha}(1) \\ \vdots \\ x_{i\alpha}(T) \end{pmatrix} \quad (5\text{-}2)$$

$$v_{i\alpha} = \begin{pmatrix} v_{i\alpha}(0) \\ v_{i\alpha}(1) \\ \vdots \\ v_{i\alpha}(T) \end{pmatrix} \quad (5\text{-}3)$$

$$v_{i\alpha}^{(-)} = \begin{pmatrix} v_{i\alpha}(0) \\ v_{i\alpha}(1) \\ \vdots \\ v_{i\alpha}(T-1) \end{pmatrix} \quad (5\text{-}4)$$

The equality constraint $v_{i\alpha}\hat{}(-)=Wx_{i\alpha}$ in the above-described equation (4) means defining time change of the position variable $v_{i\alpha}$, for example, from the current time (for example, 0) to the next time (for example, 1) as a speed variable $v_{i\alpha}$, and equation (4) shows that the position variable matrix $x_{i\alpha}$ and the speed variable matrix $v_{i\alpha}$ that minimize the evaluation function H based on this equality constraint are output.

Lagrange multiplier method is applied to deal with such optimization problem. Variables ($p_{i\alpha}$, $q_{i\alpha}$) of the evaluation function H independently separated from the variables ($x_{i\alpha}$, $v_{i\alpha}$) of the equality constraint are also prepared, and the equality constraint (corresponding to an additional equality constraint) to make variables ($p_{i\alpha}$, $q_{i\alpha}$) of the evaluation function and variables of the equality constraint ($x_{i\alpha}$, $v_{i\alpha}$) agree with each other is added. That is, a pair of variables p and q related to the evaluation function H, the position variable $x_{i\alpha}$ and the speed variable $v_{i\alpha}$ related to the equality constraint are replaced as separate variables, and an equality constraint condition making these variables coincide with each other respectively is prepared.

When applying the Lagrange multiplier method to the evaluation function H with equality constraint in equation (4), the evaluation function can be expressed as in equation (6).

[Equation 6]

$$\operatorname*{argmin}_{\{x_{i\alpha}\},\{v_{i\alpha}\}} \left[ H(\{x_{i\alpha}\}, \{v_{i\alpha}\}) + \sum_{i=1}^{N} \sum_{\alpha=1}^{M} \lambda_{i\alpha}^{T}(v_{i\alpha}^{(-)} - W_{xi\alpha}) \right] \quad (6)$$

In equation (6), N represents the number of vehicles including the subject car C1 and the different cars C2 and C3, and M represents the dimension number (for example, 2). Here, $\lambda_{i\alpha}$ indicates a Lagrange multiplier matrix and can be shown by the following equation (7).

[Equation 7]

$$\lambda_{i\alpha} = \begin{pmatrix} \lambda_{i\alpha}(0) \\ \lambda_{i\alpha}(1) \\ \vdots \\ \lambda_{i\alpha}(T-1) \end{pmatrix} \quad (7)$$

Further, when the position variable matrix $x_{i\alpha}$ and the speed variable matrix $v_{i\alpha}$ which are variables of the evaluation function H and the position variable matrix $x_{i\alpha}$ and the speed variable matrix $v_{i\alpha}$ which are variables of the equality constraint term are separated, and the equality constraint in which the separated pair of variables agree with each other is added, the following equation (8) can be expressed.

[Equation 8]

$$\operatorname*{argmin}_{\{x_{i\alpha}\},\{v_{i\alpha}\},\{p_{i\alpha}\},\{q_{i\alpha}\}} \left[ H(\{p_{i\alpha}\}, \{q_{i\alpha}\}) + \sum_{i=1}^{N} \sum_{\alpha=1}^{M} \lambda_{i\alpha}^{T}(v_{i\alpha}^{(-)} - W_{xi\alpha}) \right] \quad (8)$$

s.t. $x_{i\alpha} - p_{i\alpha} = 0$, $v_{i\alpha} - q_{i\alpha} = 0$

Here, a pair of variable matrixes $p_{i\alpha}$ and $q_{i\alpha}$ are newly introduced variables, and the equality constraint first equation of equation (8) shows that the variable matrix $p_{i\alpha}$ agrees with the position variable matrix $x_{i\alpha}$, and the equality constraint second equation shows that the variable matrix $q_{i\alpha}$, agrees with the speed variable matrix $v_{i\alpha}$.

Various methods can be conceived as methods for solving the optimization problem with equality constraint, but the inventors have derived an idea that it may be preferable to further treat the added equality constraint with the augmented Lagrange method. When the augmented Lagrange method is applied to equation (8), the equation can be expressed as the following equation (9).

[Equation 9]

$$\operatorname*{argmin}_{\{x_{i\alpha}\},\{v_{i\alpha}\},\{p_{i\alpha}\},\{q_{i\alpha}\}} \quad (9)$$

$$\left[ H(\{p_{i\alpha}\}, \{q_{i\alpha}\}) + \sum_{i=1}^{N} \sum_{\alpha=1}^{M} \theta_{x,i\alpha}^{T}(x_{i\alpha} - p_{i\alpha}) + \frac{\rho_x}{2}\|x_{i\alpha} - p_{i\alpha}\|_2^2 + \right.$$
$$\left. \sum_{i=1}^{N} \sum_{\alpha=1}^{N} \theta_{v,i\alpha}^{T}(v_{i\alpha} - q_{i\alpha}) + \frac{\rho_v}{2}\|v_{i\alpha} - q_{i\alpha}\|_2^2 + \sum_{i=1}^{N} \sum_{\alpha=1}^{M} \lambda_{i\alpha}^{T}(v_{i\alpha}^{(-)} - W_{Xi\alpha}) \right]$$

The second term and the third term of equation (9) represent mathematical equation expansion using the augmented Lagrange method with respect to $x_{i\alpha}-p_{i\alpha}=0$ of the equality constraint first equation in equation (8), and the fourth term and the fifth term of equation (9) represent mathematical equation expansion using the augmented Lagrange method with respect to $v_{i\alpha}-q_{i\alpha}=0$ of the equality constraint second equation in equation (8). The second term to fifth term of equation (9) are terms that are provided for gradually approaching the equality constraint first and second equations of equation (8) which is a new equality constraint, and $\rho_x$ and $\rho_v$ detects deviations from the new equality constraint and updates the augmented Lagrange multiplier matrixes and $\theta_{x,i\alpha}$ and $\theta_{v,i\alpha}$ to make the matrixes approach new equality constraint. As a result, the evaluation function H can be minimized while keeping new equality constraint satisfied. This detailed description will be made later. In Equation (9), the augmented Lagrange multiplier matrixes $\theta_{x,i\alpha}$ and $\theta_{v,i\alpha}$ can be expressed as the following equations (10-1) and (10-2).

[Equation 10]

$$\theta_{x,i\alpha} = \begin{pmatrix} \theta_{x,i\alpha}(0) \\ \theta_{x,i\alpha}(1) \\ \vdots \\ \theta_{x,i\alpha}(T) \end{pmatrix} \quad (10\text{-}1)$$

$$\theta_{v,i\alpha} = \begin{pmatrix} \theta_{v,i\alpha}(0) \\ \theta_{v,i\alpha}(1) \\ \vdots \\ \theta_{v,i\alpha}(T) \end{pmatrix} \quad (10\text{-}2)$$

Figure 6:
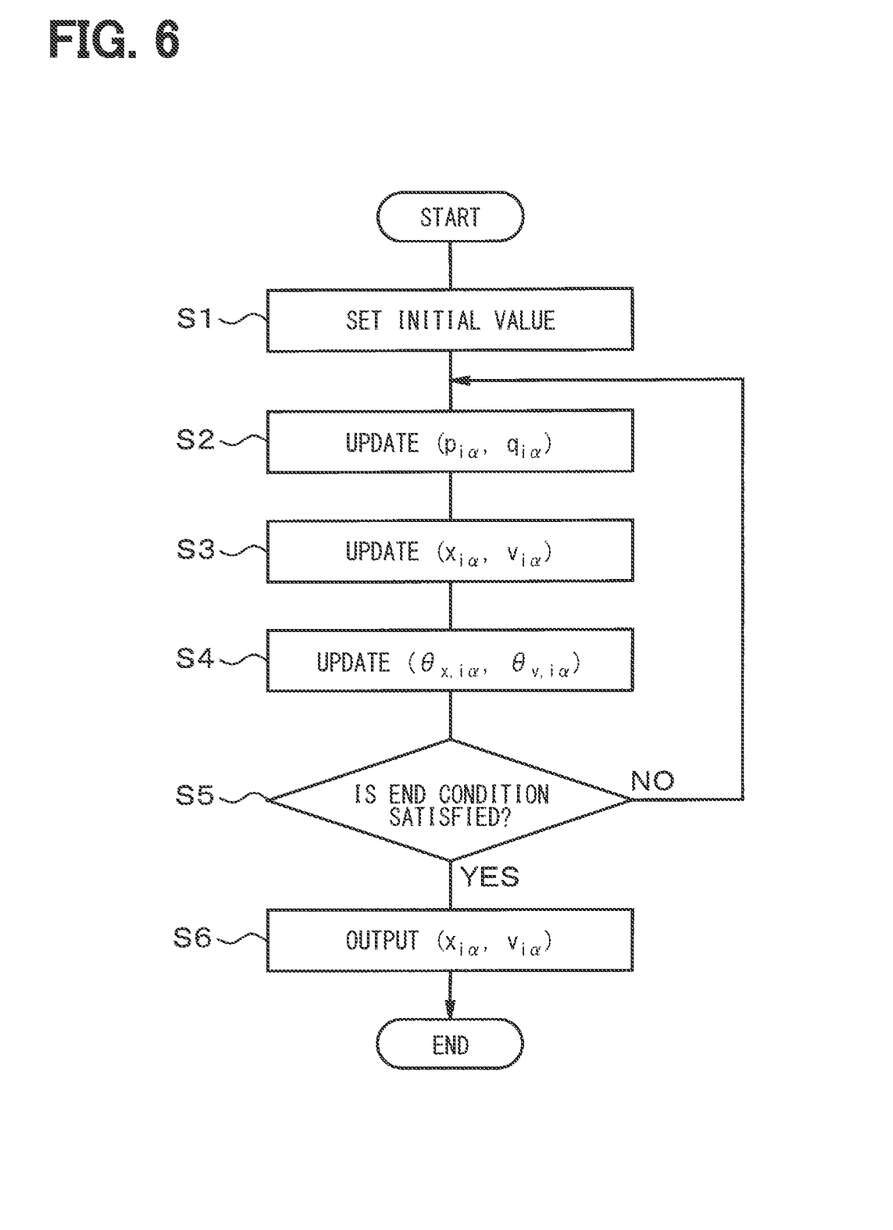
FIG. 6 is a flowchart for illustrating a flow of processing.

The detailed description of the solving method of the optimization problem related to this route search processing will be made below with reference to the drawings of FIG. 6 and subsequent figures. FIG. 6 is a flowchart showing the solving process of the optimization problem relating to the route search processing executed by the route search apparatus 1.

As shown in FIG. 6, the controller 2 of the route search apparatus 1 sets an initial value at S1 in FIG. 6. The initial value is a value obtained by accumulating information on the current positions $x_{i\alpha}(0)$ of the subject car C1 and the different cars C2, and C3, and the current traveling speeds $v_{i\alpha}(0)$ of the subject car C1 and the different cars C2 and C3. These pieces of information can be acquired using the information obtained from the position detector 3, the speed sensor 4, the map information acquisition portion 5, and the like.

By regularly updating these pieces of information at any time, the controller 2 accumulates, as initial values, past history information on the position variable $x_{i\alpha}$ and the speed variable v of the subject car C1 and the different cars C2 and C3 at times 0 to T. As a result, past history information on the position variable $x_{i\alpha}$ and the speed variable $v_{i\alpha}$ of the subject car C1 and the different cars C2 and C3 at times 0 to T can be accumulated as initial values, as shown in equation (3).

Using these pieces of information, the controller 2 updates a pair of values $(p_{i\alpha}, q_{i\alpha})$ in equation (9) at S2 in FIG. 6. The processing of S2 corresponds to the updating processing of the evaluation function H by the evaluation function updating section 10, and the processing of S2 shows a processing of updating position variable and speed variable $(p_{i\alpha}, q_{i\alpha})$ of the evaluation function H so that the equality constraint is gradually approached while searching for a condition at which the evaluation function H approaches the local minimum value. Although various methods can be considered as a method of updating these values $(p_{i\alpha}, q_{i\alpha})$, it has been confirmed by the inventors that it is preferable to apply an auxiliary function method. This auxiliary function method is one method used when making various values extreme, and shows a method of replacing the evaluation function H with a quadratic function approximating the evaluation function H and making the values extreme based on the replaced quadratic function.

Figure 7:
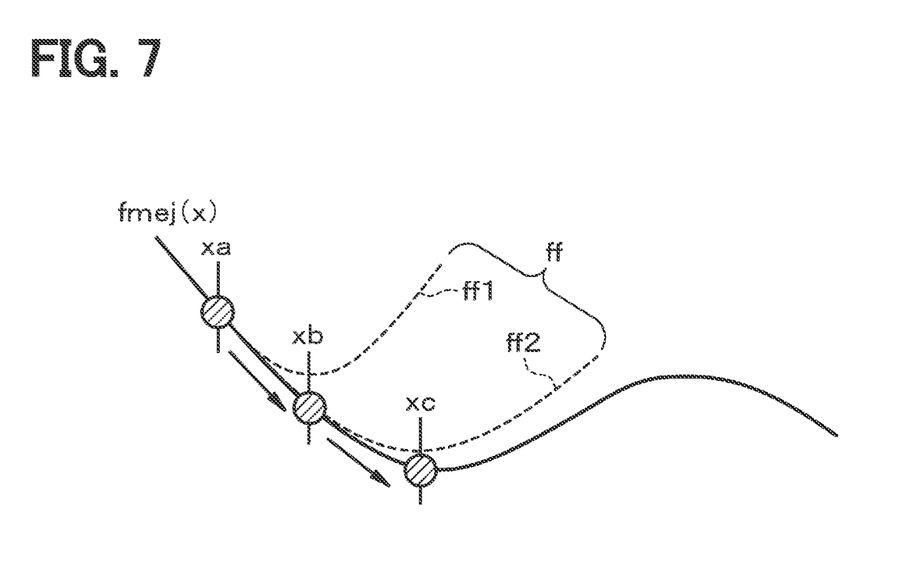
FIG. 7 is an explanatory diagram of an auxiliary function method.

Hereinafter, the auxiliary function method will be briefly described. A detailed image of the auxiliary function method is shown in FIG. 7. As shown in FIG. 7, for example, a quadratic function ff using a Lipschitz constant L is introduced, which passes through the evaluation value fmej (x^*) when the evaluation function of the one-dimensional variable x is assumed to be fmej (x), and the current solution candidate x^* (for example, xa in FIG. 7) is substituted for the variable x of this evaluation function fmej (x), and in addition which satisfies a condition that the differential value thereof is equal to the partial differential value a fmej (x^*)/∂x of the evaluation function fmej (x), and obtains a value greater than the evaluation values fmej ($x_i$) in all the variables $x_i$ in the search space including the solution candidate x^*. When this quadratic function ff is mathematically expressed, the function can be shown as the right side of equation (11-1). Further, when a solution satisfying the condition that the quadratic function ff becomes an extreme value is assumed to be xz, equation (11-2) can be derived.

[Equation 11]

$$f_{mej}(x) \leq f_{mej}(x^*) + \frac{\partial f_{mej}(x^*)}{\partial x}(x - x^*) + \frac{L}{2}(x - x^*)^2 \quad (11\text{-}1)$$

$$xz = x^* - \frac{1}{L} \cdot \frac{\partial f_{mej}(x^*)}{\partial x} \quad (11\text{-}2)$$

In these equations (11-1) and (11-2), L represents the Lipschitz constant, and x^* represents the current solution candidate of the variable x. When the right side of equation (11-2) is differentiated, equation (12) can be derived.

[Equation 12]

$$\frac{\partial}{\partial x}\left[f_{mej}(x^*) + \frac{\partial f_{mej}(x^*)}{\partial x}(x - x^*) + \frac{L}{2}(x - x^*)^2\right] = \quad (12)$$
$$\frac{\partial f_{mej}(x^*)}{\partial x} + L(x - x^*)$$

At this time, substituting the solution candidate x^* for the variable x can make the second term of equation (12) zero, and the differential value in the current solution candidate x^* becomes equal to the first term on the right side of equation (12). The first term on the right side of equation (12) agrees with the partial differential value a fmej (x^*)/∂x of the evaluation function fmej at the solution candidate x^*. Also, this quadratic function ff is a value greater than the evaluation value fmej ($x_i$) of the evaluation function fmej with all the variables $x_i$, including the solution candidate x^*. It is may be a preferable method to obtain the extreme value of the evaluation function fmej using such a quadratic function ff.

As shown in equation (11-2), by repeatedly deriving the solution candidate xz, when the current solution candidate is assumed to be xa, the quadratic function ff1 is searched for first, and a solution that satisfies the extreme value of the quadratic function ff1 is taken as a next solution candidate xb, and then a quadratic function ff2 is again searched for with respect to this next solution candidate xb so that a solution satisfying the extreme value of the quadratic function ff2 is updated to become a solution candidate xc, as shown in FIG. 7. In the case of the example of FIG. 7, the solution candidate changes so as to be xa→xb→xc. A solution (for example, xc) that can be regarded as the extreme value of the evaluation function fmej (x) can be obtained when these processes satisfy the end condition by repeating, for example, a predetermined number of times or more.

Applying such an auxiliary function method to the evaluation function H({$p_{i\alpha}$, $q_{i\alpha}$}) of equation (9) and replacing the function with a quadratic function gives the following equations (13-1) and (14-1).

[Equation 13]

$$H(\{p_{i\alpha}\}, \{q_{i\alpha}\}) \leq H(\{p_{i\alpha}^*\}, \{q_{i\alpha}^*\}) + \quad (13\text{-}1)$$
$$\frac{\partial H(\{p_{i\alpha}^*\}, \{q_{i\alpha}^*\})}{\partial p_{i\alpha}(t)}[p_{i\alpha}(t) - p_{i\alpha}^*(t)] + \frac{L_{p,i\alpha}(t)}{2}[p_{i\alpha}(t) - p_{i\alpha}^*(t)]^2$$

$$\tilde{p}_{i\alpha}(t) = \frac{L_{p,i\alpha}(t)}{L_{p,i\alpha}(t) + \rho_x}\left[p_{i\alpha}^*(t) - \frac{1}{L_{p,i\alpha}(t)} \cdot \frac{\partial H(\{p_{i\alpha}^*\}, \{q_{i\alpha}^*\})}{\partial p_{i\alpha}(t)}\right] + \quad (13\text{-}2)$$
$$\frac{\rho_x}{L_{p,i\alpha}(t) + \rho_x}\left[x_{i\alpha}^*(t) + \frac{\theta_{x,i\alpha}^*(t)}{\rho_x}\right]$$

-continued

[Equation 14]

$$H(\{p_{i\alpha}\}, \{q_{i\alpha}\}) \leq H(\{p_{i\alpha}^*\}, \{q_{i\alpha}^*\}) + \qquad (14\text{-}1)$$
$$\frac{\partial H(\{p_{i\alpha}^*\}, \{q_{i\alpha}^*\})}{\partial q_{i\alpha}(t)}[q_{i\alpha}(t) - q_{i\alpha}^*(t)] + \frac{L_{q,i\alpha}(t)}{2}[q_{i\alpha}(t) - q_{i\alpha}^*(t)]^2$$

$$\tilde{q}_{i\alpha}(t) = \frac{L_{q,i\alpha}(t)}{L_{q,i\alpha}(t) + \rho_v}\left[q_{i\alpha}^*(t) - \frac{1}{L_{q,i\alpha}(t)} \cdot \frac{\partial H(\{p_{i\alpha}^*\}, \{q_{i\alpha}^*\})}{\partial q_{i\alpha}(t)}\right] + \qquad (14\text{-}2)$$
$$\frac{\rho_v}{L_{p,i\alpha}(t) + \rho_v}\left[v_{i\alpha}^*(t) + \frac{\theta_{v,i\alpha}^*(t)}{\rho_v}\right]$$

Equation (13-1) shows a mathematical equation made by applying the auxiliary function method when minimizing p in equation (9), and $\tilde{p}_{i\alpha}(t)$ in equation (13-2) indicates the next solution candidates of $p_{i\alpha}$. Equation (14-1) shows a mathematical equation to which the auxiliary function method is applied when minimizing $q_{i\alpha}$ in equation (9), and $\tilde{q}_{i\alpha}(t)$ in equation (14-2) indicates the next solution candidate of $q_{i\alpha}$. By sequentially updating these solution candidates $\tilde{p}_{i\alpha}(t)$ and $\tilde{q}_{i\alpha}(t)$, and repeating the update predetermined number of times for example, a pair of values $(\tilde{p}_{i\alpha}, \tilde{q}_{i\alpha})$ satisfying the condition that the evaluation function $H(\{p_{i\alpha}, q_{i\alpha}\})$ is minimized, can be updated.

Next, using the updated pair of variables $(p_{i\alpha}, q_{i\alpha})$, the controller 2 updates the position variable and the speed variable $(x_{i\alpha}, v_{i\alpha})$ in equation (9) at S3 in FIG. 6. The processing at S3 in FIG. 6 corresponds to the updating process of the equality constraint variable $(x_{i\alpha}, v_{i\alpha})$ by the equality constraint variable updating section 11, and the processing of S3 indicates processing updating the equality constraint variable $(x_{i\alpha}, v_{i\alpha})$ so that a condition at which the evaluation function H approaches the extreme value while keeping the equality constraint satisfied is gradually approached. At this time, equation (9) can be regarded as respective quadratic functions of $x_{i\alpha}$ and $v_{i\alpha}$ when $(p_{i\alpha}, q_{i\alpha})$ is regarded as a constant, so that update solutions $(\tilde{x}_{i\alpha}, \tilde{v}_{i\alpha})$ can be derived as in equations (15-1) and (15-2).

[Equation 15]

$$\tilde{x}_{i\alpha} = \left(\tilde{p}_{i\alpha} - \frac{\theta_{x,i\alpha}^*}{\rho_x}\right) + \frac{1}{\rho_s}W^T\lambda_{i\alpha} \qquad (15\text{-}1)$$

$$\left.\begin{array}{l}\tilde{v}_{i\alpha}^{(-)} = \left(\tilde{q}_{i\alpha}^{(-)} - \frac{\theta_{v,i\alpha}^{*(-)}}{\rho_v}\right) - \frac{1}{\rho_v}\lambda_{i\alpha} \quad t = 0 \sim T-1 \\ \tilde{v}_{i\alpha}(T) = \tilde{q}_{i\alpha}(T) - \frac{\theta_{v,i\alpha}^*(T)}{\rho_v} \qquad t = T\end{array}\right\} \qquad (15\text{-}2)$$

Next, the Lagrange multiplier $\lambda_{i\alpha}$ included in equations (15-1) and (15-2) is derived. By deriving the Lagrange multiplier $\lambda_{i\alpha}$ that satisfies the original equality constraint $v_{i\alpha}x^{\wedge}(-) = Wx_{i\alpha}$ shown in equation (4), the equation can be developed as shown in equation (16).

[Equation 16]

$$\lambda_{i\alpha} = \left(\frac{1}{\rho_v} + \frac{1}{\rho_x}WW^T\right)^{-1}\left[\left(\tilde{q}_{i\alpha}^{(-)} - \frac{\theta_{v,i\alpha}^{*(-)}}{\rho_v}\right) - W\left(\tilde{p}_{i\alpha} - \frac{\theta_{x,i\alpha}^*}{\rho_x}\right)\right] \qquad (16)$$

Therefore, by substituting the equation (16) into equations (15-1) and (15-2), the update solutions $(\tilde{x}_{i\alpha}, \tilde{v}_{i\alpha})$ can be derived as shown in equations (17-1) and (17-2).

[Equation 17]

$$\tilde{x}_{i\alpha} = [1 - W^T(WW^T)^{-1}W]\left(\tilde{p}_{i\alpha} - \frac{\theta_{x,i\alpha}^*}{\rho_x}\right) + W^T(WW^T)^{-1}\tilde{v}_{i\alpha}^{(-)} \qquad (17\text{-}1)$$

$$\left.\begin{array}{l}\tilde{v}_{i\alpha}^{(-)} = \left[1 + \frac{\rho x}{\rho v}(WW^T)^{-1}\right]^{-1} \\ \left[\left(\tilde{q}_{i\alpha}^{(-)} - \frac{\theta_{v,i\alpha}^{*(-)}}{\rho v}\right) + \frac{\rho x}{\rho v}(WW^T)^{-1}W\left(\tilde{p}_{i\alpha} - \frac{\theta_{x,i\alpha}^*}{\rho x}\right)\right] \quad t = 0 \sim T-1 \\ \tilde{v}_{i\alpha}(T) = \tilde{q}_{i\alpha}(T) - \frac{\theta_{v,i\alpha}^*(T)}{\rho_v} \qquad t = T\end{array}\right\} \qquad (17\text{-}2)$$

Since the original equality constraint $v_{i\alpha}x^{\wedge}(-) = Wx_{i\alpha}$ shown in equation (4) is kept satisfied, the update solution $(\tilde{x}_{i\alpha}, \tilde{v}_{i\alpha})$ can be updated so as to always keep the original equality constraint satisfied.

Next, after calculating these update solutions $(\tilde{x}_{i\alpha}, \tilde{v}_{i\alpha})$ and $(\tilde{p}_{i\alpha}, \tilde{q}_{i\alpha})$, the controller 2 derives update solutions $(\tilde{\theta}_{x,i\alpha}, \tilde{\theta}_{v,i\alpha})$ by using these update solutions at S4 in FIG. 6. At this time, the solution is derived as shown in the following equations (18-1) and (18-2).

[Equation 18]

$$\tilde{\theta}_{x,i\alpha} = \theta_{x,i\alpha}^* + \rho_x(\tilde{x}_{i\alpha} - \tilde{p}_{i\alpha}) \qquad (18\text{-}1)$$

$$\tilde{\theta}_{v,i\alpha} = \theta_{v,i\alpha}^* + \rho_v(\tilde{v}_{i\alpha} - \tilde{q}_{i\alpha}) \qquad (18\text{-}2)$$

As described above, the update solutions $(\tilde{x}_{i\alpha}, \tilde{v}_{i\alpha})$ and $(\tilde{p}_{i\alpha}, \tilde{q}_{i\alpha})$ are calculated and these update solutions $(\tilde{x}_{i\alpha}, \tilde{v}_{i\alpha})$ and $(\tilde{p}_{i\alpha}, \tilde{q}_{i\alpha})$ are updated as needed so as to satisfy the additional equality constraint, but there is a deviation in these update solutions. Therefore, it may be preferable to update the augmented Lagrange undetermined variables $(\theta_x, \theta_v)$ so as to approach the additional equality constraints, by introducing constants $(\rho_x, \rho_v)$ for detecting deviations of variables $(p_{i\alpha}, q_{i\alpha})$ of the evaluation function and variables $(x_{i\alpha}, v_{i\alpha})$ of the equality constraint from the additional equality constraint, and deriving the variables as shown in equations (18-1) and (18-2). This makes it possible to correct deviation as much as possible.

The controller 2 repeats these processes from S2 to S4 in FIG. 6 until the end condition is satisfied. The end condition may be, for example, based on whether the number of updates exceeds a predetermined upper limit number or not, or for example, other conditions such as whether or not the evaluation value of the evaluation function H acquired by substituting the obtained position variable $x_{i\alpha}$ and the speed variable $v_{i\alpha}$ is equal to or less than a predetermined value may be used.

When the predetermined end condition is satisfied, the controller 2 outputs the position variable and the speed variable $(x_{i\alpha}, v_{i\alpha})$. As a result, the optimum value of the route according to the optimum position variable x and the speed variable v of the subject car C1 in the future can be searched for. In this case, the optimum value of the speed variable v need not be derived. As a result, the position variable x and the speed variable v of each of movable bodies C1, C2 and C3 at the future time can be estimated and output as solutions, and the route corresponding to the position variable can be searched out as an optimum route. In addition, since the position variable and the speed variable $(x_{i\alpha}, v_{i\alpha})$ are updated so as to always satisfy the equality constraint, and even if the process is ended in the middle of the extreme value creating process described above and the position variable and the speed variable $(x_{i\alpha}, v_{i\alpha})$ are output as a solution, the variable value actually practicable by the movable body can be output, and the unrealistic variable value, that is, an unrealistic route is not outputted. The process of S6 and the position variable $x_{i\alpha}$ correspond to the optimum route search processing by the route search section 12.

The subject car C1 (also referred to as a subject vehicle) may include a vehicle control apparatus for control the subject car C1 by controlling power and steering force of the subject car C1. The vehicle control apparatus may receive the output from the controller 2 such as the position variable and the speed variable $(x_{i\alpha}, v_{i\alpha})$. Thereby, based on the output, the vehicle control apparatus drives a steering wheel actuator for steering a steering wheel of the subject car C1, an accelerator actuator for driving an accelerator pedal of the subject car C1, and a brake actuator for driving a brake pedal of the subject car C1, so that a driving support is achieved. Herein, for example, the vehicle control apparatus may be configured by a microcontroller having a CPU (central processing unit), a ROM (read only memory), a RAM (random access memory), and an I/O device (input-and-output device). A part or all of the vehicle control apparatus may be configured by hardware such as ASIC (application specific integrated circuit) or FPGA (field programmable gate array). Further, the controller 2 and the vehicle control apparatus may be an integrated body or may be a separated body.

The features of the present embodiment are conceptually summarized.

According to the present embodiment, a procedure for updating the variables $p_{i\alpha}$, and $q_{i\alpha}$, of the evaluation function $H(\{x_{i\alpha}, v_{i\alpha}\})$ so that the equality constraint is gradually approached while searching for a condition to make the evaluation function $H(\{x_{i\alpha}, v_{i\alpha}\})$ close to the extreme value, and a procedure for updating the variable of the equality constraint such that a condition to make the evaluation function $H(\{x_{i\alpha}, v_{i\alpha}\})$ approach the extreme value while keeping the equality constraint satisfied is gradually approached are repeatedly executed alternately. In this manner, the optimum control at high speed can be processed while the variable of the equality constraint always satisfies the equality constraint. Also, a procedure for updating the variables $x_{i\alpha}$, and $v_{i\alpha}$, of the equality constraint are repeatedly executed by using the Lagrange multiplier λ to satisfy the additional equality constraint that makes the variables $p_{i\alpha}$ and $q_{i\alpha}$ of the evaluation function $H(\{x_{i\alpha}, v_{i\alpha}\})$ and the variables $x_{i\alpha}$ and $v_{i\alpha}$ of the equality constraint coincide with each other. Thus, the optimum control can be processed at high speed.

In particular, when the method is applied to the route search processing, the updating process by the evaluation function updating section 10 and the updating process by the equality constraint variable updating section 11 are iterated and a route corresponding to the position variable $x_{i\alpha}$ obtained by satisfying the predetermined end condition is searched for as an optimum route. Thus, the optimum route can be searched out. In addition, since the position variable and the speed variable $(x_{i\alpha}, v_{i\alpha})$ always satisfy the equality constraint, even if the processing is ended in the middle of the extreme value creating processing and the solutions of the position variable and the speed variable $(x_{i\alpha}, v_{i\alpha})$ are output, a variable value practicable by the movable body in a realistic way can be output as a solution and a solution of unrealistic variable values or routes are not output.

When the augmented Lagrange method using the augmented Lagrange multipliers $(\theta_x, \theta_v)$ and constant $(\rho_x, \rho_v)$ for detecting the deviation of the variable (p, q) of the evaluation function H and the variable (x, v) of the equality constraint from the additional equality constraint is adapted for calculation, the augmented Lagrange multipliers $(\theta_x, \theta_v)$ is updated after the variables (p, q) of the evaluation function H and the variables (x, v) of the equality constraint are updated. This makes it possible to correct the deviation.

Other Embodiment

The present disclosure is not limited to the above-described embodiments, and can be modified or expanded as follows.

In the above embodiment, a mode of outputting the optimum values of the position variable $x_{i\alpha}$, and the speed variable $v_{i\alpha}$, as solutions is described, but the evaluation value corresponding to the position variable and the speed variable $v_{i\alpha}$, that is, the evaluation value made by substituting the variable $x_i$ to be outputted as a solution into the evaluation function H may be output as the solution. A mode in which the equality constraint with the position variable and the speed variable $(x_{i\alpha}, v_{i\alpha})$ as variables is applied, but the mode can be applied to a generalized nonlinear optimization process of a continuous value optimization problem. Although the mode in which an absolute minimum value and a local minimum value are applied as extreme values is shown, the embodiment can also be applied to the case where the absolute maximum value and the local maximum value are applied as extreme values.

In the drawings, reference numeral 1 denotes a driving support device as a route search apparatus and an optimization apparatus, reference numeral 2 denotes an evaluation function updating section, an equality constraint variable updating section, a route search section, an augmented Lagrange multiplier updating section, and an extreme value creating section executed by a controller, reference numeral 10 denotes the evaluation function updating section, reference numeral 11 denotes the equality constraint variable updating section, and reference numeral 12 denotes the route search section.

It is noted that a flowchart or the processing of the flowchart in the present application includes multiple steps (also referred to as sections), each of which is represented, for instance, as S1. Further, each step can be divided into several sub-steps while several steps can be combined into a single step.

Controllers and methods described in the present disclosure may be implemented by a special purpose computer created by configuring a memory and a processor programmed to execute one or more particular functions embodied in computer programs. Alternatively, the control units, the controllers and the methods described in the present disclosure may be implemented by a special purpose computer created by configuring a processor provided by one or more special purpose hardware logic circuits. Further alternatively, the control units, the controllers and the methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While various embodiments, configurations, and aspects of a nonlinear optimization program of continuous value optimization problem, a route search program, and route search apparatus according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. A non-transitory computer-readable storage medium storing a nonlinear optimization program of a continuous value optimization problem, the program relating to an optimization problem and deriving an optimum value of an evaluation function or a variable of an equality constraint satisfying a condition that the evaluation function to which the equality constraint corresponding to the variable of the equality constraint is given approaches an extreme value,
wherein the program executes processing by preparing a variable of the evaluation function independently separated from the variable of the equality constraint when applying a Lagrange multiplier method with the equality constraint by using a Lagrange multiplier to the evaluation function, and by using an additional equality constraint causing the variable of the evaluation function and the variable of the equality constraint to agree with each other, and
the program causes an optimization apparatus to execute repeatedly and alternately procedure comprising:
updating the variable of the evaluation function, causing the equality constraint to be gradually approached while searching for a condition at which the evaluation function approaches the extreme value; and
updating the variable of the equality constraint, causing a condition at which the evaluation function to become close to the extreme value while keeping the equality constraint satisfied is gradually approached.

2. The non-transitory computer-readable storage medium storing the nonlinear optimization program of a continuous value optimization problem according to claim 1, wherein:
the program makes a calculation by applying an augmented Lagrange method using
augmented Lagrange multipliers to be updated so that the additional equality constraint is approached and
constants detecting a deviation of the variable of the evaluation function and the variable of the equality constraint from the additional equality constraint; and
the program updates the augmented Lagrange multipliers after updating the variable of the evaluation function and the variable of the equality constraint.

3. The non-transitory computer-readable storage medium storing the nonlinear optimization program of a continuous value optimization problem according to claim 2, wherein:
when deriving the extreme value of the variable of the evaluation function,
the program creates the extreme value by using an auxiliary function method in which
replacement is made by a quadratic function that satisfies a condition that a differential value when a solution candidate of the extreme value is substituted after the solution candidate is obtained is equal to a differential value of the evaluation function, and a value greater than evaluation values of all variables including the solution candidate is obtained, and
the extreme value of the quadratic function is repeatedly updated as a solution candidate of a next value.

4. A non-transitory computer-readable storage medium storing a route search program that searches for a route corresponding to a position variable satisfying a condition that an evaluation function to which an equality constraint according to the position variable and a speed variable is given approaches an extreme value as an optimum route,
wherein the program executes processing by preparing a pair of variables of the evaluation function independently separated from the position variable and the speed variable of the equality constraint when applying a Lagrange multiplier method with the equality constraint according to the position variable and the speed variable to the evaluation function, and by using an additional equality constraint causing the pair of variables of the evaluation function to agree with and the position variable and the speed variable of the equality constraint respectively, and
the program causes a route search apparatus to execute procedure comprising:
updating the pair of variables of the evaluation function, causing the equality constraint to be gradually approached while searching for a condition at which the evaluation function approaches the extreme value;
updating the position variable and the speed variable of the equality constraint, causing a condition at which the evaluation function approaches the extreme value while keeping the equality constraint satisfied to be gradually approached; and
searching for a route corresponding to the position variable obtained by satisfying a predetermined end condition as an optimum route, after repeating the procedure of updating the pair of variables of the evaluation function and the procedure of updating the position variable and the speed variable of the equality constraint.

5. The non-transitory computer-readable storage medium storing the route search program according to claim 4, wherein:
the program makes a calculation by applying an augmented Lagrange method using augmented Lagrange multipliers to be updated so that the additional equality constraint is approached and constants for detecting a deviation of the pair of variables of the evaluation function and the position variable and the speed variable of the equality constraint from the additional equality constraint; and
the program updates the augmented Lagrange multipliers after updating the pair of variables of the evaluation function and the position variable and the speed variable of the equality constraint.

6. The non-transitory computer-readable storage medium storing the route search program according to claim 5, wherein:
when deriving the extreme value of the evaluation function at a time of updating the pair of variables of the evaluation function,
the program creates the extreme value by using an auxiliary function method in which
replacement is made by a quadratic function that satisfies a condition that a differential value when a solution candidate of the extreme value is substituted after the solution candidate is obtained is equal to a differential value of the evaluation function, and a value greater than evaluation values of all variables including the solution candidate is obtained, and the extreme value of the quadratic function is repeatedly updated as a solution candidate of a next value.

7. A route search apparatus that searches for a route corresponding to a position variable satisfying a condition that an evaluation function to which an equality constraint according to the position variable and a speed variable is given approaches an extreme value as an optimum route,
wherein the apparatus prepares a pair of variables of the evaluation function independently separated from the position variable and the speed variable of the equality constraint when applying a Lagrange multiplier method with the equality constraint according to the position variable and the speed variable to the evaluation function, and performs processing using an additional equality constraint that causes the pair of variables of the evaluation function and the position variable and the speed variable of the equality constraint to agree with each other respectively, the apparatus comprising:
a processor that includes:
an evaluation function updating section that updates the pair of variables of the evaluation function, causing the equality constraint to be gradually approached while searching for a condition at which the evaluation function approaches the extreme value;
an equality constraint variable updating section that updates the position variable and the speed variable of the equality constraint, causing a condition at which the evaluation function approaches the extreme value while keeping the equality constraint satisfied to be gradually approached; and
a route search section that repeatedly performs an updating process by the evaluation function updating section and an updating process by the equality constraint variable updating section, and searches for a route corresponding to the position variable obtained by satisfying a predetermined end condition, as an optimum route.

8. The route search apparatus according to claim 7, wherein:
the apparatus makes a calculation by applying an augmented Lagrange method using augmented Lagrange multipliers to be updated so that the additional equality constraint is approached and constants for detecting a deviation of the pair of variables of the evaluation function and the position variable and the speed variable of the equality constraint from the additional equality constraint; and
the processor further comprises an augmented Lagrange multiplier updating section updating the augmented Lagrange multipliers after updating the pair of variables of the evaluation function and the position variable and the speed variable of the equality constraint.

9. The route search apparatus according to claim 8, wherein:
when the evaluation function updating section derives the extreme value of the evaluation function at a time of updating the pair of variables of the evaluation function,
the processor further comprises an extreme value creating section that is configured to create the extreme value by using an auxiliary function method in which
replacement is made by a quadratic function satisfying a condition that a differential value when a solution candidate of the extreme value is substituted after the solution candidate is obtained is equal to a differential value of the evaluation function, and a value greater than evaluation values of all variables in a search space including the solution candidate is obtained, and
the extreme value of the quadratic function is repeatedly updated as a solution candidate of a next value.

* * * * *